United States Patent
Meek et al.

(10) Patent No.: US 10,607,314 B2
(45) Date of Patent: Mar. 31, 2020

(54) IMAGE AUTO RESIZING

(71) Applicant: Universal City Studios LLC, Universal City, CA (US)

(72) Inventors: Troy Meek, Orlando, FL (US); Nithin Kumar, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 160 days.

(21) Appl. No.: 15/866,419

(22) Filed: Jan. 9, 2018

(65) Prior Publication Data

US 2019/0213709 A1    Jul. 11, 2019

(51) Int. Cl.
*G06T 3/40* (2006.01)
*G06K 9/36* (2006.01)
*G06K 9/62* (2006.01)

(52) U.S. Cl.
CPC ............. *G06T 3/40* (2013.01); *G06K 9/36* (2013.01); *G06K 9/6253* (2013.01); *G09G 2340/04* (2013.01)

(58) Field of Classification Search
None
See application file for complete search history.

(56) References Cited

U.S. PATENT DOCUMENTS

| | | | | |
|---|---|---|---|---|
| 8,471,889 B1* | 6/2013 | Lee | ............. | H04N 7/15 348/14.07 |
| 2006/0013464 A1* | 1/2006 | Ramsay | ............. | G06K 9/3241 382/132 |
| 2007/0120864 A1* | 5/2007 | Uzawa | ............. | G09G 5/363 345/581 |
| 2012/0134595 A1* | 5/2012 | Fonseca | ............. | G06T 3/40 382/195 |
| 2013/0069880 A1* | 3/2013 | Stark | ............. | G06T 1/60 345/168 |
| 2013/0328878 A1* | 12/2013 | Stahl | ............. | G06F 3/1431 345/428 |
| 2015/0103092 A1* | 4/2015 | Khambanonda | ...... | G06F 17/212 345/593 |
| 2016/0042494 A1* | 2/2016 | Baek | ............. | H04N 21/4858 348/468 |
| 2017/0243356 A1* | 8/2017 | Eckert | ............. | G06T 3/40 |
| 2018/0061363 A1* | 3/2018 | Lee | ............. | G06F 3/147 |

* cited by examiner

*Primary Examiner* — Iman K Kholdebarin
(74) *Attorney, Agent, or Firm* — Lee, Hong, Degerman, Kang & Waimey (57) ABSTRACT

Systems and methods for autonomously generating one or more images are disclosed. According to at least one embodiment, a method of autonomously generating one or more images includes: receiving, by a content server, an image having one or more characteristics rendering the image suitable for display at a device of a first breakpoint type; in response to receiving the image, autonomously deriving, by the content server, at least one image from the received image, the at least one derived image having one or more characteristics optimized for display at a device of a second breakpoint type different from the first breakpoint type; and controlling, by the content server, a display to display the received image and the at least one derived image.

20 Claims, 9 Drawing Sheets

IMAGE AUTO RESIZING

BACKGROUND

In the field of webpage development and administration, one or more images may be received and/or generated for display as part of a webpage. The images are then stored for later such display at a target device. For example, when the target device sends a request for the webpage, the stored images are sent to the target device. The stored images can then be displayed at the target device.

The stored images may be displayed at a variety of target devices (or breakpoints). Examples of such target devices include desktop computers and mobile devices. The mobile devices include devices such as tablet computer devices and mobile telephones (e.g., smartphones).

SUMMARY

Target devices that are part of such a variety of devices may have (or be coupled to) displays of varying sizes. For example, a desktop computer typically is coupled to a display (e.g., a display monitor) that is larger than the display of a mobile device, such as the display of a tablet computer device or the display of a mobile telephone. In addition, mobile devices, themselves, may have displays of varying sizes. For example, the display of a tablet computer device typically is larger than the display of a mobile telephone.

Embodiments of the present disclosure include an apparatus and a method for autonomously generating one or more images. In at least one embodiment, one or more images are autonomously derived from a received image, without waiting to receive further input (or instruction) from a user. Each derived image has one or more characteristics that render the derived image more suitable for display at one or more particular target devices (or breakpoints).

According to at least one embodiment, a method of autonomously generating one or more images includes: receiving, by a content server, an image having one or more characteristics rendering the image suitable for display at a device of a first breakpoint type; in response to receiving the image, autonomously deriving, by the content server, at least one image from the received image, the at least one derived image having one or more characteristics optimized for display at a device of a second breakpoint type different from the first breakpoint type; and controlling, by the content server, a display to display the received image and the at least one derived image.

A terminal according to an embodiment of the present disclosure may include a network communication unit configured to transmit and receive data, and one or more controllers configured to: receive an image having one or more characteristics rendering the image suitable for display at a device of a first breakpoint type; in response to receiving the image, autonomously derive at least one image from the received image, the at least one derived image having one or more characteristics optimized for display at a device of a second breakpoint type different from the first breakpoint type; and control a display to display the received image and the at least one derived image.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION

In the following detailed description, reference is made to the accompanying drawing figures which form a part hereof, and which show by way of illustration specific embodiments of the present invention. It is to be understood by those of ordinary skill in the technological field of webpage generation and content management that other embodiments may be utilized, and that structural, electrical, as well as procedural changes may be made without departing from the scope of the present invention. Wherever possible, the same reference numbers will be used throughout the drawings to refer to the same or similar parts.

Embodiments of the present invention relate to a system and method for autonomously generating one or more images. In this disclosure, the content will be discussed primarily with respect to images generated for distribution via data and Internet transmission protocols. The term "distribution" will be used broadly to include various delivery methods of content, including air, cable, satellite, Internet, wireless, and other platforms known in the art, and shall not be limited to a particular technology or platform. One of ordinary skill in the art will appreciate that this disclosure is not to be limited to this list, or the following discussion, and is applicable to various other formats, medium, platforms, and distribution channels known to those skilled in the art.

Embodiments are directed to maintaining and/or generating images for devices of different breakpoint types—e.g., a desktop computer, a tablet computer, and/or a smartphone. Such devices may have (or be coupled to) displays of varying sizes.

An image that is received may not be particularly suitable for display at a device of a particular breakpoint type. For example, the received image may be suitable for display at a device having a relatively large display (e.g., a desktop computer). However, the received image may not be particularly suitable for display at a device of another breakpoint type. For example, the received image may not be particularly suitable for display at a device having a smaller-sized display (e.g., a tablet computer or a smartphone). According to at least one embodiment, one or more images are autonomously generated to better accommodate devices of such other breakpoint types. Such images may be sized or cropped appropriately, to enhance viewing at smaller-sized displays.

In addition (or alternatively), the generated image typically has a smaller file size, and, therefore, facilitates faster and/or easier downloading thereof.

Figure 1:
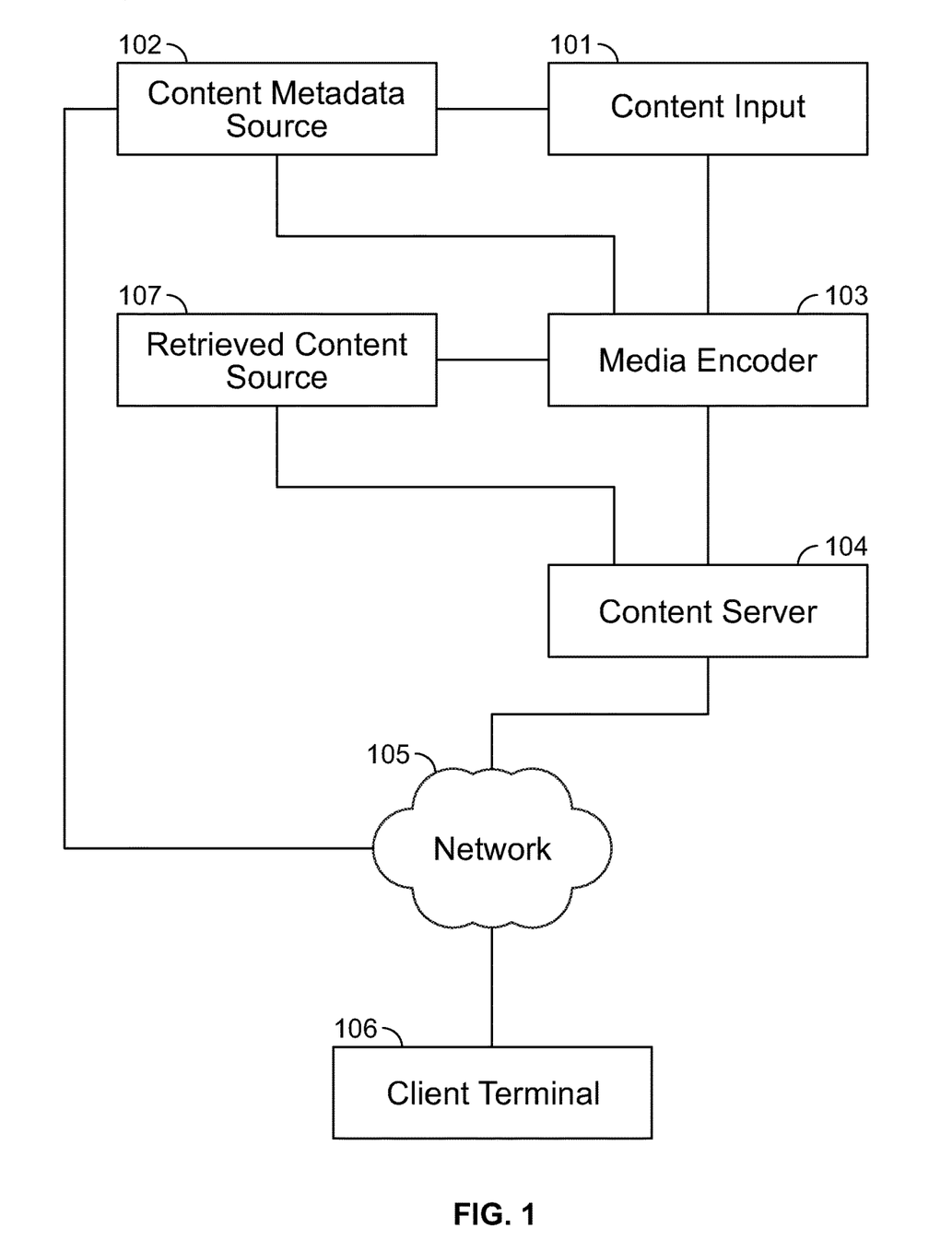
FIG. 1 is an illustration of a system for autonomously generating one or more images according to at least one embodiment.

Referring to FIG. 1, a system 100 for autonomously generating one or more images is illustrated. The system 100 may be configured to generate, encode, distribute, and store images related to one or more webpages, as well as receive and handle requests from a client terminal for presentation of the webpages. FIG. 1 will be discussed with respect to documents that are suitable for the World Wide Web, web browsers, etc. However, this disclosure is not to be limited thereto, and it will be understood by those of ordinary skill in the art that the features discussed herein are applicable to numerous other applications, platforms, and content delivery methods well known by those of ordinary skill in the art.

The system 100 may include a content input 101 in which content is created and/or generated for encoding and distribution. At the content input 101, a particular image may be captured and/or uploaded. According to other embodiments of the system 100, the image may be otherwise provided from various sources including video (e.g., television broadcast, cable video distribution systems, satellite content distribution, Internet video, streaming video, mobile video distribution systems, digital video downloads, etc.). For purposes of brevity, examples of the content will be described herein with respect to an image that is uploaded. However, it is understood that other types of images may be utilized.

The embodiment of the system 100 may further include a content metadata source 102, which creates, gathers, compiles, and/or provides metadata related to the image for compilation and incorporation with the distributed content. For example, the metadata may describe how large the image is, a color depth for the image, an image resolution, when the image was created, a shutter speed used to capture the image, and other data.

In the system 100, the content metadata source 102 and the content input 101 may be coupled to a media encoder 103, which is configured to encode image files of the content, along with encoded metadata of the content. The encoded image files are then made available for downloading (e.g., to a web browser).

In some embodiments, the encoded image files may correspond to commonly known compressed or uncompressed file formats including JPEG/JFIF, JPEG 2000, Exif, TIFF, GIF, BMP, PNG, etc. However, it is understood that this disclosure is not limited thereto, and that numerous other compressions and formats may be utilized. The encoder may encode image content and cause the generated encoded files to be distributed by a content server 104.

The media encoder 103 may also be configured to cause encoded image files to be concurrently stored in a memory associated with the content server 104. In some embodiments the media encoder 103 may also be configured to provide the encoded image files to a retrieved content source 107 where it may be stored for retrieval. In other embodiments, the encoded media files may be stored in a database external to the system, and the content server 104 or the retrieved content source 107 may be configured to store pointers or path descriptions for querying and/or requesting the encoded media files from the external database for later retrieval.

According to at least one embodiment, the encoded image files may be stored in the retrieved content source 107 along with metadata associated with the media files. In some embodiments, the retrieved content source 107 may also receive metadata directly from content metadata source 102, for association and storage with the encoded image files.

Returning to the content server 104 of the system 100, the content server may include a plurality of content servers, each configured to handle requests for image files and to facilitate transmission of image files to requesting parties. As illustrated in FIG. 1, the content server 104 may be in communication with a client terminal 106 via a network 105.

The content server 104 may be configured to receive requests from the client terminal 106 for image content, and provide information to the client terminal 106 in response to the request. The information may include data associated with the encoded image content or address information for retrieving files of the encoded image content. It will be understood that content server 104 may be configured to provide information, data, and media content other than images, including video, audio, text, metadata, etc.

For example, content server 104 may be an enterprise server, a web server, a media server, a mobile data server, or any other type of server. In some embodiments, the content server 104 may be a computer or a computer program responsible for accepting requests (e.g., HTTP, RTSP, or other protocols that can initiate a media session) from client terminal 106 and serving client terminal 106 with image content. Although not shown in FIG. 1, embodiments are considered in which the client terminal 106 is configured to transmit and receive data directly to and from a separate web server, which in turn transmits and receives data transmissions to and from the content server 104 via a network such as the network 105.

The network 105 may include various systems for distribution of content including any desired combination of hardwired and wireless communication links, including wide area networks (WAN), local area networks (LAN), wireless networks suitable for packet-type communications, over-the-air, cable, Internet, other network connection systems, etc., which implement networks and hardware known and used in the related art, including broadcast technologies, cable or satellite distribution systems, Internet protocol (IP), or other networked technologies, etc. Examples of the content include images, live and recorded television, movies, Internet streaming video and audio, music, radio or other audio-visual content, and the like. The system 100 may also include a gateway (not depicted), for example, a server, a router, a firewall server, a host, a proxy server, request redirector, etc.

The client terminal 106 may be connected to the network 105. The client terminal 106 may be a hardware component including software code and applications that are configured to allow the client terminal to communicate, transmit, request, and receive data packets, which may correspond to image data, via the network 105. The client terminal 106 may include any terminal or system configured to receive a content signal, and, in some embodiments, the client terminal 106 may be configured to decode received encoded image files and prepare the content for presentation to a user via an output device such as a display. The output device may be implemented in the same hardware as the client terminal 106, or, in some embodiments, the output device may be implemented in a separate hardware or location from the client terminal 106 and be otherwise coupled and/or associated with the client terminal, such as by wired connection or wireless communication.

In some embodiments, the client terminal 106 may also be configured to transmit information to one or more other aspects of the system 100 via the network 105, or similar network, regarding the content data received and decoded by the client terminal 106. Various other embodiments of the client terminal 106 may include televisions, desktop computers, laptop computers, tablet computers, mobile smartphones, personal media devices, wearable devices, set top box receivers, streaming Internet content devices, satellite television receivers, etc. In other embodiments, the client terminal 106 may be implemented in more than one connected device.

In an embodiment, the client terminal 106 may request, retrieve, and/or receive particular content from the content server 104 via the network 105. The request, retrieval, and/or the receiving of the particular content may correspond to a user of a client terminal entering a particular URL or address at the client terminal, or utilizing a content provider-specific application that is configured to connect to the content server 104 to transmit and receive instructions or requests for retrieval of specific content items.

Figure 2:
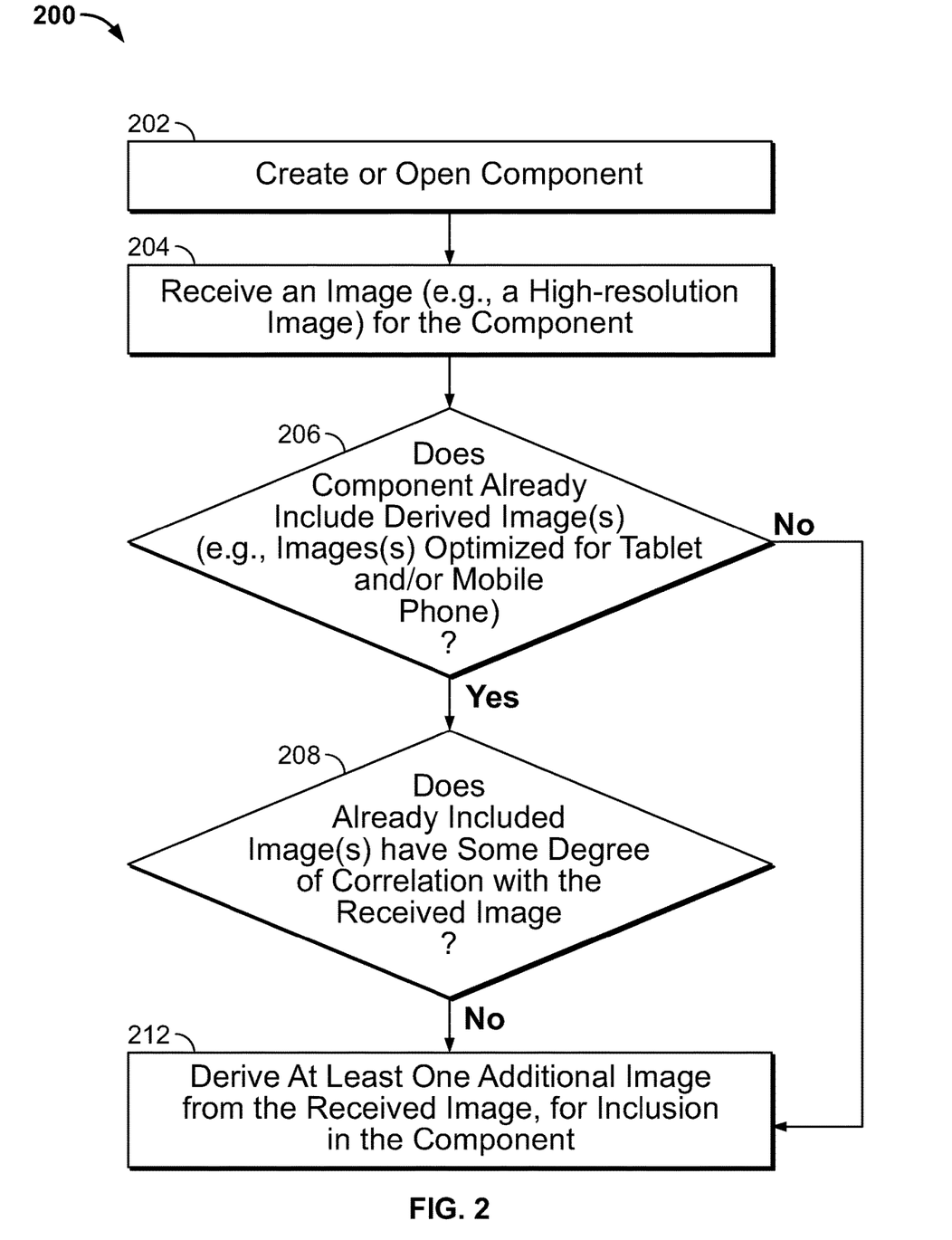
FIG. 2 is a flow diagram illustrating a method of autonomously generating images according to at least one embodiment.

FIG. 2 is a flow diagram 200 illustrating a method of autonomously generating images according to at least one embodiment.

With reference to block 202, a component is created or opened by a user (e.g., in order to update the component). According to embodiments described herein, the component forms a portion of a particular webpage, such that a group of components forms the webpage. By way of example, the user may be a content producer (e.g., a web content producer).

With reference to block 204, an image for the component is received. By way of example, the image is uploaded by the content producer. The image may be for a particular image-embedded schema of the component.

The received image has one or more characteristics that render the image more suitable for display at a device of a first type of breakpoint. For purposes of explanation, various embodiments will be described with reference to receiving a high-resolution image (or higher-resolution image) that is more suitable for display at a desktop computer, than at a device of a second type of breakpoint (e.g., a tablet computer device or a mobile telephone). However, it is understood that the received image may be more suitable for display at a device other than a desktop computer.

With reference to block 212, at least one additional image is autonomously derived from the received image. For example, the additional image is derived without requiring further input from the user (e.g., without requiring and/or receiving additional instructions from the user). The additional image has one or more characteristics that are selected to render the image more suitable for display at a device of a breakpoint type that is different from the first breakpoint type. For example, the derived image has one or more characteristics that are optimized (or selected) to render the image more suitable for display at a device that features a display that is smaller in size than a display typically associated with a desktop computer. Such a device may be a mobile device (e.g., a tablet computer or a mobile telephone).

The one or more characteristics that are optimized may include an image aspect ratio, an image resolution, an image format, a color density, and/or image metadata. For example, with respect to image aspect ratio, the additional image may be autonomously derived by autonomously cropping the received image. As such, the derived image has an image aspect ratio that is different from the image aspect ratio of the image that was received at block 204.

According to at least one embodiment, the image aspect ratio of the derived image is selected to match (or approximate) a target aspect ratio. The target aspect ratio may be a value that is stored in memory (e.g., as part of a target configuration). For example, with reference back to FIG. 1, such a target configuration may be stored in a memory associated with the content server 104, or the retrieved content source 107.

For example, the image aspect ratio of the derived image is selected to match a target aspect ratio that is more congruent with a display typically associated with a tablet computer. As another example, the image aspect ratio of the derived image is selected to match a target aspect ratio that is more congruent with a display typically associated with a mobile telephone.

According to at least one embodiment, the additional image is generated by autonomously cropping the received image beginning at the center (or approximate center) of the received image. As will be described in more detail later with respect to further embodiments, such cropping of the received image may be adjusted (e.g., manually adjusted) by the user.

The received image and the derived image(s) are then stored as part of the component. Accordingly, multiple images are stored to facilitate transmission of the images to devices of different breakpoint types. The received image and the derived image(s) are then displayed for review by the user.

With continued reference to FIG. 2—according to at least one embodiment, additional features are performed prior to the image derivation that was described previously with reference to block 212. For example, with reference to block 206, it is determined whether the component already includes one or more derived images that are optimized for a device of a different breakpoint type. For example, as described previously with reference to block 204, the received image is more suitable for display at a desktop computer. In such a situation, with reference to block 206, it is determined whether the component already includes derived images that are optimized for a device of a different breakpoint type (e.g., a tablet computer and/or a mobile telephone). If the component does not include such images, then the derivation of block 212 is performed.

If the component does include such images, then, with reference to block 208, it is determined whether the included images have some degree of correlation with the image that was received at block 204. If it is determined that the included images are correlated with the received image in such a manner, then the derivation of block 212 is not performed. Conversely, if it is determined that the included images are not correlated with the received image, then the derivation of block 212 is performed.

According to at least one embodiment, the names (e.g., filenames) of the images are analyzed to determine whether the included images are correlated with the received image. For example, if the file naming pattern of the included images is sufficiently different from the file naming pattern of the received image, then it is determined that the included images are not correlated with the received image. Otherwise, it is determined that the included images are correlated with the received image. A particular example of such an analysis will be described in more detail later with reference to FIGS. 4A and 4B.

According to at least one other embodiment, timestamp information of the images is analyzed to determine whether the included images are correlated with the received image. For example, if the timestamp information of the images indicates that the received image is newer (e.g., more recently updated) relative to the included images, then it is determined that the included images are not correlated with the received image. Accordingly, the derivation of block 212 is performed. Otherwise, it is determined that the included images are correlated with the received image. Accordingly, the derivation of block 212 is not performed.

As described earlier with reference to block 212, the additional image is generated by autonomously cropping the received image starting from the center of the received image. The received image and the derived image(s) are then displayed for review by the user.

According to at least one further embodiment, the user is afforded the opportunity to modify the derived image(s). For example, the user can adjust (e.g., via manual adjustments) the cropping of the received image that had been performed to produce the derived images. In this situation, the user is allowed to adjust the cropping of the received image to the left and/or the right of the center of the image. In addition, the user is allowed to adjust the cropping along other directions with respect to the center of the image. Furthermore, the user is given the flexibility to increase and/or decrease the degree to which the received image is cropped. Accordingly, a smaller and/or larger portion of the received image may be included in the derived image. Once the user is satisfied with the appearance of the derived image, then he/she can save the derived image as part of the component.

An example of the method illustrated by the flow diagram 200 will now be described with reference to FIGS. 3A, 3B, 4A and 4B.

Figure 3A:
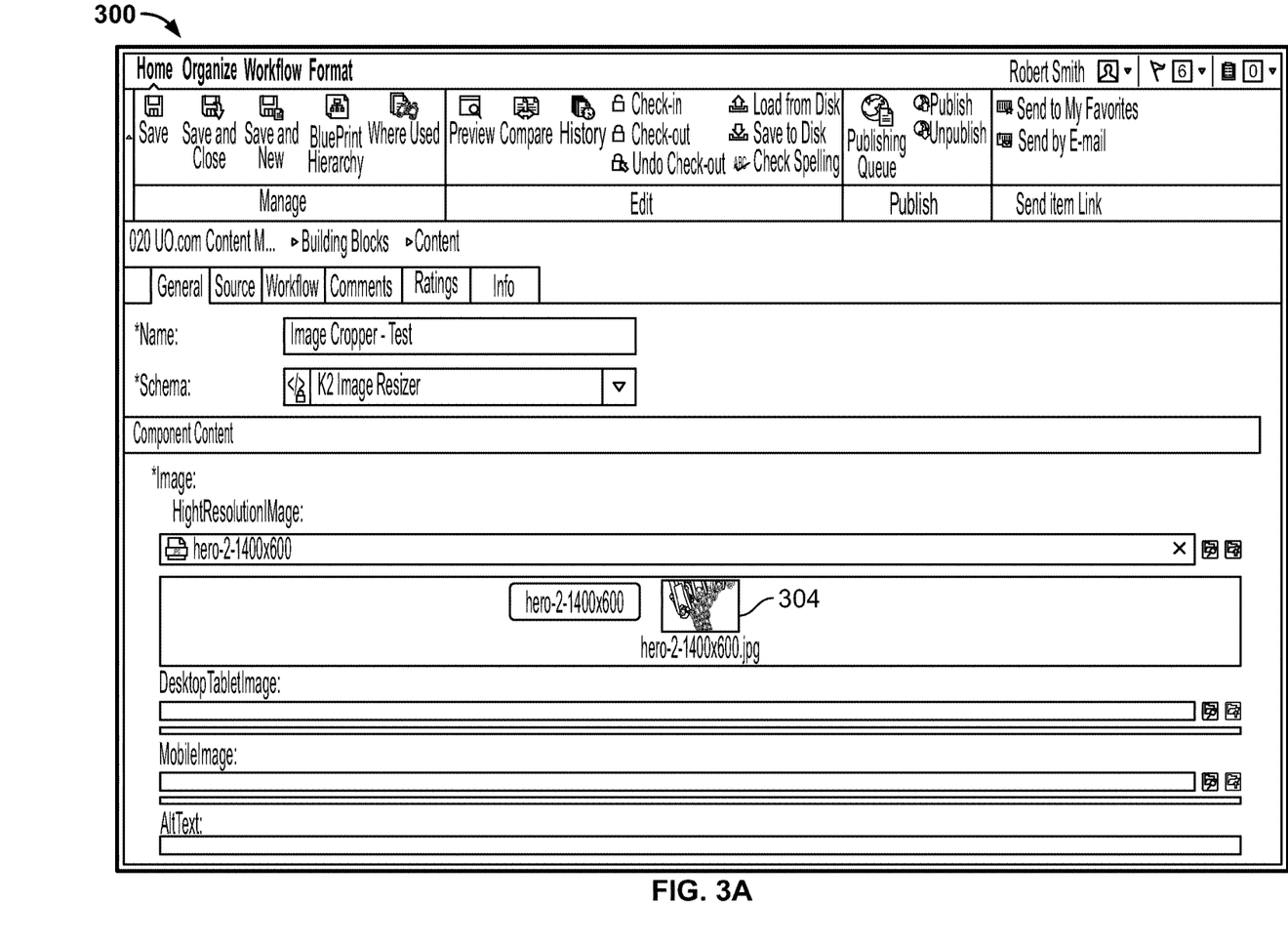
FIGS. 3A and 3B illustrate examples of a screen displayed at a client terminal.

FIG. 3A illustrates an example of a screen 300 displayed at a client terminal (e.g., the client terminal 106). The screen 300 illustrates a user interface corresponding to a component that is created or opened. The component forms a portion of a webpage that may be viewed at two or more different breakpoints (e.g., at devices of two or more different breakpoint types).

The screen 300 includes a thumbnail 304. The thumbnail 304 is of an image that is received for inclusion in the component. As described previously with reference to block 204, the received image may be a high-resolution image (or higher-resolution image) that is more suitable for display at a desktop computer. For example, the received image is a 1400-by-600-pixel image.

When the user saves the received image (represented by the thumbnail 304), at least one image is autonomously derived from the received image.

Figure 3B:
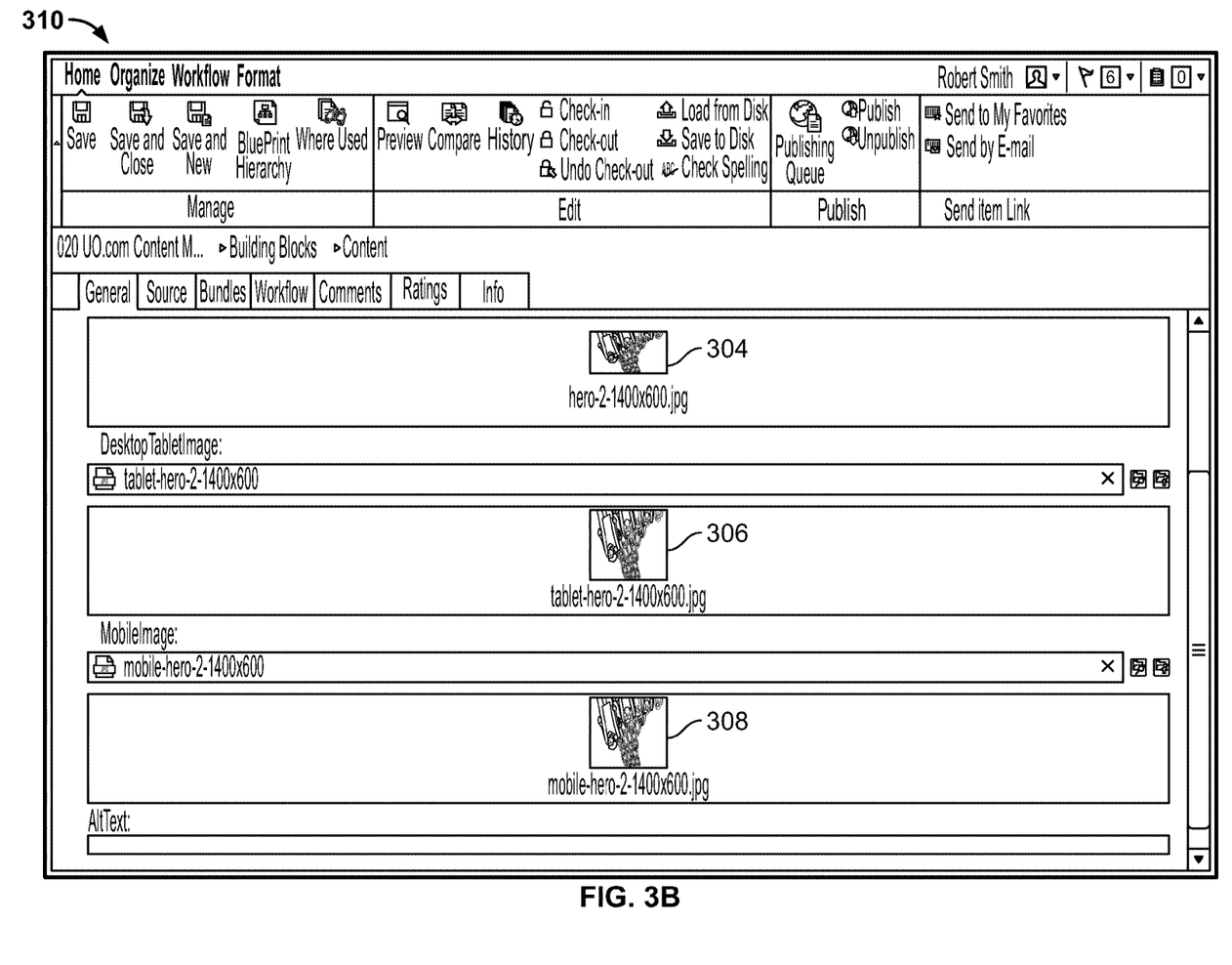

FIG. 3B illustrates an example of a screen 310 displayed at the client terminal (e.g., the client terminal 106). The screen 310 includes the thumbnail 304. In addition, the screen 310 also includes thumbnails 306 and 308. The thumbnails 306 and 308 represent images derived from the received image.

The thumbnail 306 represents a 750-by-750-pixel image that is optimized for display at a tablet computer device. The thumbnail 308 represents a 640-by-640-pixel image that is optimized for display at a mobile telephone.

As described previously with reference to block 212, the 750-by-750-pixel image and 640-by-640-pixel image may have been generated by autonomously cropping the received image starting from the center of the received image. In this situation, the user is afforded the opportunity to modify the derived images. For example, the user is afforded the opportunity to adjust (e.g., via manual adjustments) the cropping of the received image that had been performed to produce the derived images.

Figure 4A:
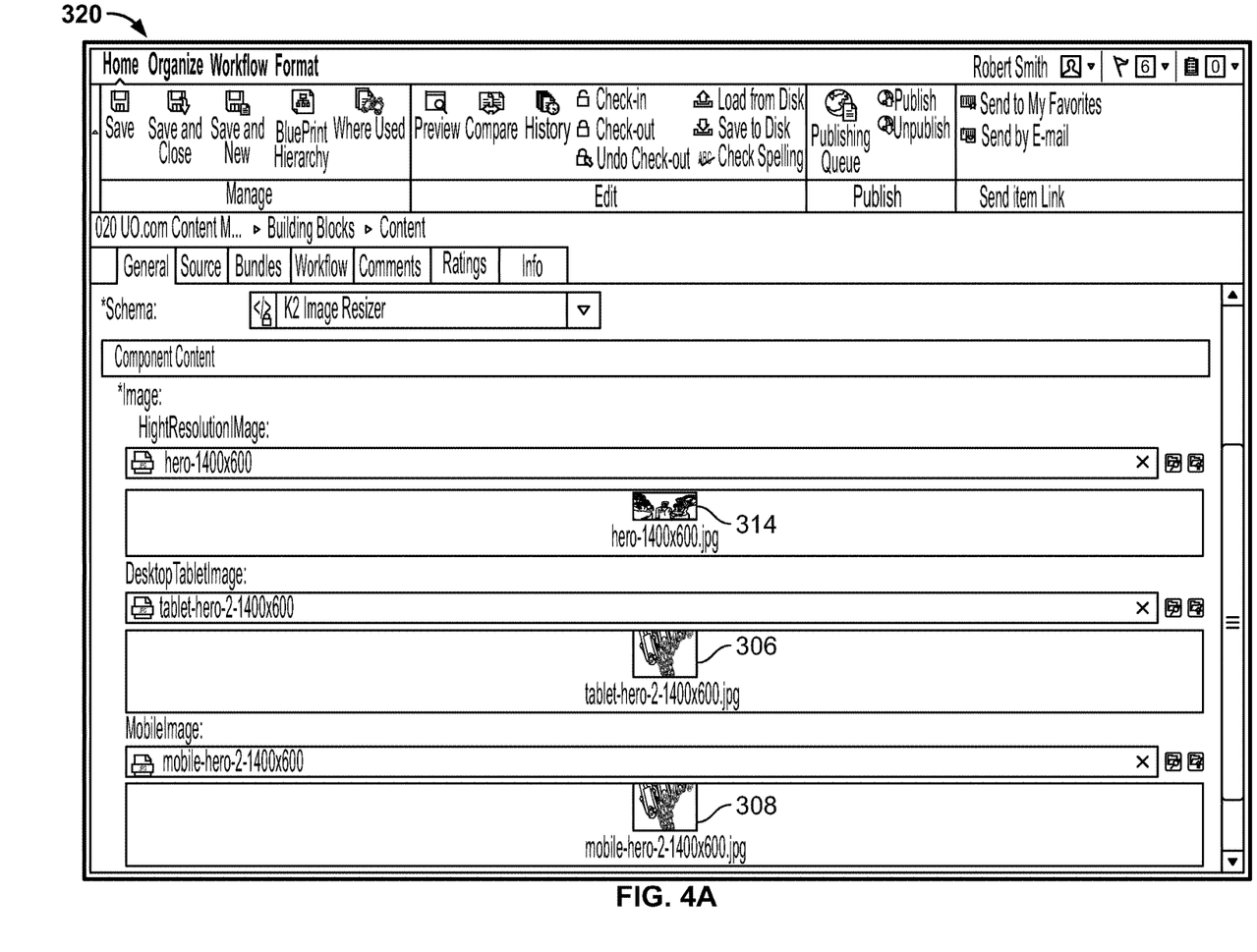
FIGS. 4A and 4B illustrate further examples of a screen displayed at a client terminal.

FIG. 4A illustrates an example of a screen 320 displayed at a client terminal (e.g., the client terminal 106). The screen 320 may be shown, e.g., when the component of FIGS. 3A and 3B is re-opened by the user.

The screen 320 includes thumbnails 306 and 308. The thumbnail 308 is shown only in part, in FIG. 4A.

The screen 320 also includes a thumbnail 314. The thumbnail 314 is of a second image that is received for inclusion in the component. As described previously with reference to block 204, the second received image may be a high-resolution image (or higher-resolution image) that is more suitable for display at a desktop computer. For example, the second received image is a 1400-by-600-pixel image.

It is determined that the component already includes derived images that are optimized for a device of a different breakpoint type (e.g., a tablet computer and/or a mobile telephone). For example, the component already includes derived images corresponding to the thumbnails 306 and 308. Accordingly, it is determined whether the included derived images have some degree of correlation with the second received image (the image corresponding to the thumbnail 314).

For example, the names (e.g., filenames) of the images are analyzed to determine whether the included images are correlated with the received image. As illustrated in FIG. 4A, the filename of the second received image (corresponding to the thumbnail 314) is "hero-1400×600.jpg." The filename of the first derived image (corresponding to the thumbnail 306) is "tablet-hero-2-1400×600.jpg." The filename of the second derived image (corresponding to the thumbnail 308) is "tablet-hero-2-1400×600.jpg".

The filename of the second received image contains the character string "hero." In contrast, the filenames of the included derived images both contain the character string "hero-2." Based on such a distinction between the filenames of the images, it is determined that the included images are not correlated with the second received image. Therefore, when the user saves the second received image (represented by the thumbnail 314) to the component, at least one image is autonomously derived from the received image.

Figure 4B:
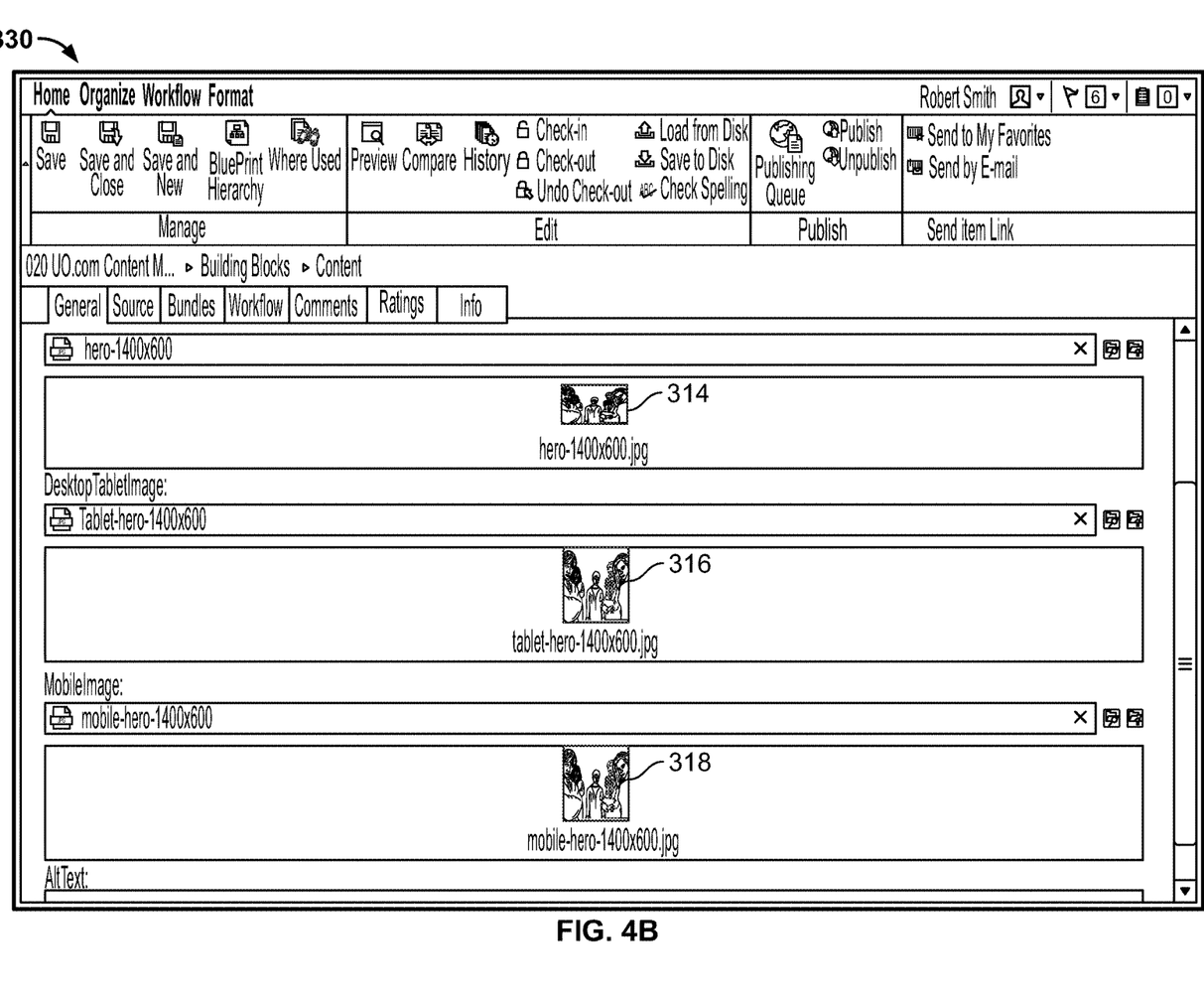

FIG. 4B illustrates an example of a screen 330 displayed at the client terminal (e.g., the client terminal 106). The screen 330 includes the thumbnail 314. In addition, the screen 330 also includes thumbnails 316 and 318. The thumbnails 316 and 318 represent images derived from the second received image.

The thumbnail 316 represents a 750-by-750-pixel image that is optimized for display at a tablet computer device. The thumbnail 318 represents a 640-by-640-pixel image that is optimized for display at a mobile telephone.

As described previously with reference to block 212, the 750-by-750-pixel image and 640-by-640-pixel image may have been generated by autonomously cropping the received second image starting from the center of the received second image. In this situation, the user is afforded the opportunity to modify the derived images. For example, the user is afforded the opportunity to adjust (e.g., via manual adjustments) the cropping of the received second image that had been performed to produce the derived images corresponding to thumbnails 316 and 318.

In the embodiment illustrated in FIG. 4B, the images corresponding to the thumbnails 314, 316, 318 respectively replace the images corresponding to the thumbnails 304, 306, 308, in the component. However, it is understood that, according to at least one other embodiment, the images corresponding to the thumbnails 314, 316, 318 may be added to the component, along with the images corresponding to the thumbnails 304, 306, 308.

Figure 5:
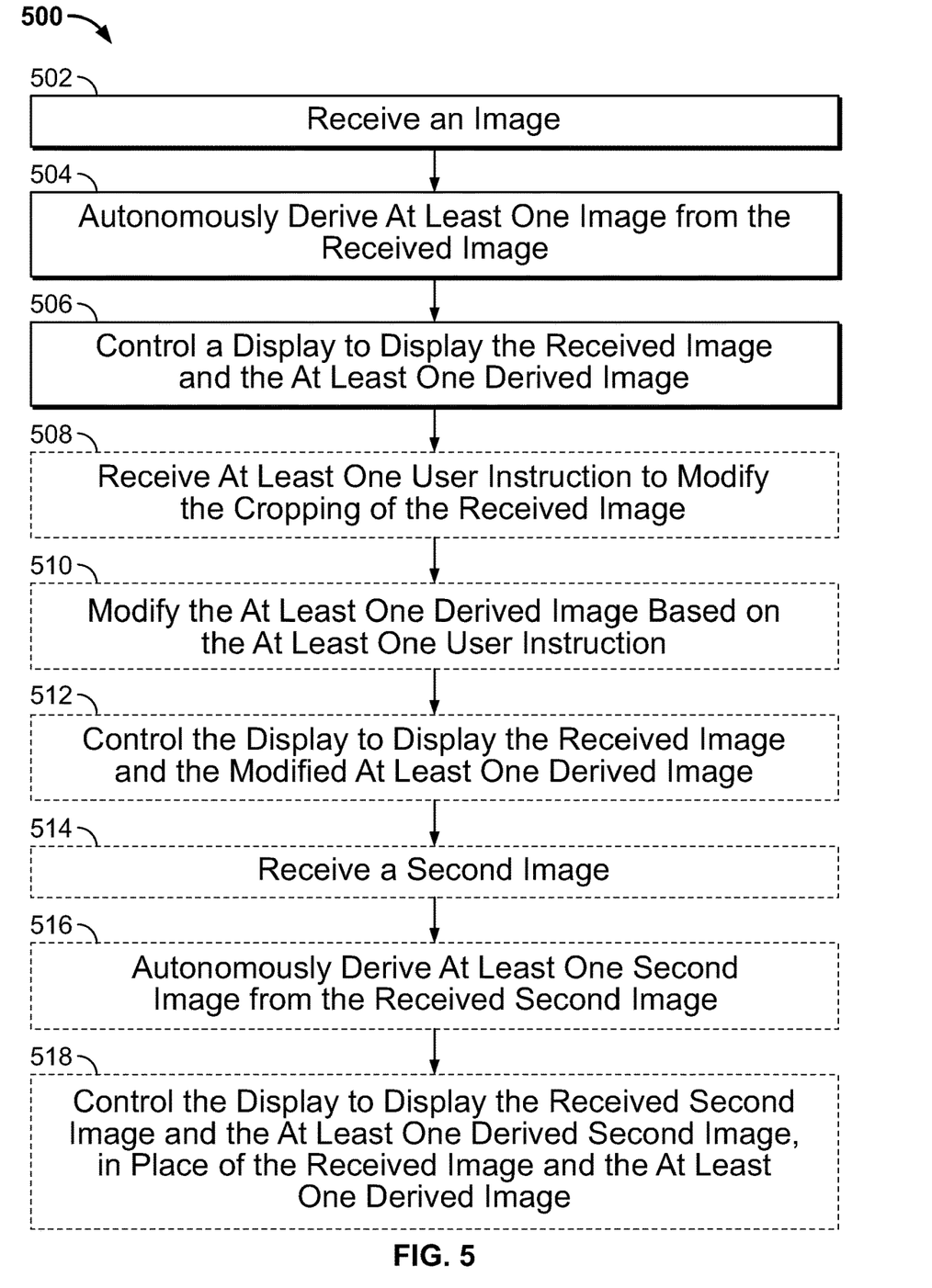
FIG. 5 is a flowchart illustrating a method of autonomously generating one or more images according to at least one embodiment.

FIG. 5 illustrates a flowchart of a method 500 of autonomously generating one or more images according to at least one embodiment.

At block 502, an image is received (see, e.g., the image represented by thumbnail 304 in FIG. 3A). The image has one or more characteristics rendering the image suitable for display at a device of a first breakpoint type.

At block 504—in response to receiving the image, at least one image is autonomously derived from the received image. For example, with reference back to FIG. 3B, images represented by thumbnails 306 and 308 are autonomously derived from the image represented by thumbnail 304. The at least one derived image may have one or more characteristics optimized for display at a device of a second breakpoint type, and the second breakpoint type may be different from the first breakpoint type.

A display of the device of the first breakpoint type may be larger in area than a display of the device of the second breakpoint type.

For example, the device of the first breakpoint type includes a desktop computer, and the device of the second breakpoint type includes a mobile device. As a further example, the mobile device includes an electronic tablet or a mobile telephone.

According to at least one particular embodiment, the at least one derived image is derived from the received image without receiving additional user instructions.

According to at least one particular embodiment, the one or more characteristics of the at least one derived image that are optimized includes an image aspect ratio, an image resolution, an image format, a color density, and/or image metadata. According to at least one further embodiment, autonomously deriving the at least one image includes autonomously deriving the at least one image to have a target image aspect ratio, a target image resolution, a target image format, and/or a target color density.

According to at least one particular embodiment, autonomously deriving the at least one image includes autonomously performing a cropping of the received image to generate the at least one derived image.

At block 506, a display is controlled to display the received image and the at least one derived image (see, e.g., FIG. 3B).

At block 508, after the at least one derived image is displayed, at least one user instruction to modify the cropping of the received image, is received. At block 510, the at least one derived image is modified based on the at least one user instruction (e.g., one or more instructions that direct a manual adjustment of the cropping of the received image). At block 512, the display is controlled to display the received image and the modified at least one derived image.

According to at least one particular embodiment, the method 500 includes additional features. For example, at block 514, a second image is received (see, e.g., the image represented by thumbnail 314 in FIG. 4A). The second image has one or more characteristics rendering the second image suitable for display at the device of the first breakpoint type.

At block 516, at least one second image is autonomously derived from the received second image. For example, with reference back to FIG. 4B, images represented by thumbnails 316 and 318 are autonomously derived from the image represented by thumbnail 314. The at least one derived second image has one or more characteristics optimized for display at the device of the second breakpoint type.

At block 518, the display is controlled to display the received second image and the at least one derived second image, in place of the received image and the at least one derived image (see, e.g., FIG. 4B).

As previously described, in at least some embodiments, the client terminal, the encoder, the content server, the web servers, or other aspects of the described system (e.g., system 100 of FIG. 1) may include one or more software or hardware computer systems and may further include (or may be operably coupled to) one or more hardware memory systems for storing information including databases for storing, accessing, and querying various content, encoded data, shared addresses, metadata, etc. In hardware implementations, the one or more computer systems incorporate one or more computer processors and controllers.

The components of various embodiments described herein may each include a hardware processor of the one or more computer systems, and, in one embodiment, a single processor may be configured to implement the various components. For example, in one embodiment, the encoder, the content server, and the web server, or combinations thereof, may be implemented as separate hardware systems, or may be implemented as a single hardware system. The hardware system may include various transitory and non-transitory memory for storing information, wired and wireless communication receivers and transmitters, displays, and input and output interfaces and devices. The various computer systems, memory, and components of the system may be operably coupled to communicate information, and the system may further include various hardware and software communication modules, interfaces, and circuitry to enable wired or wireless communication of information.

Figure 6:
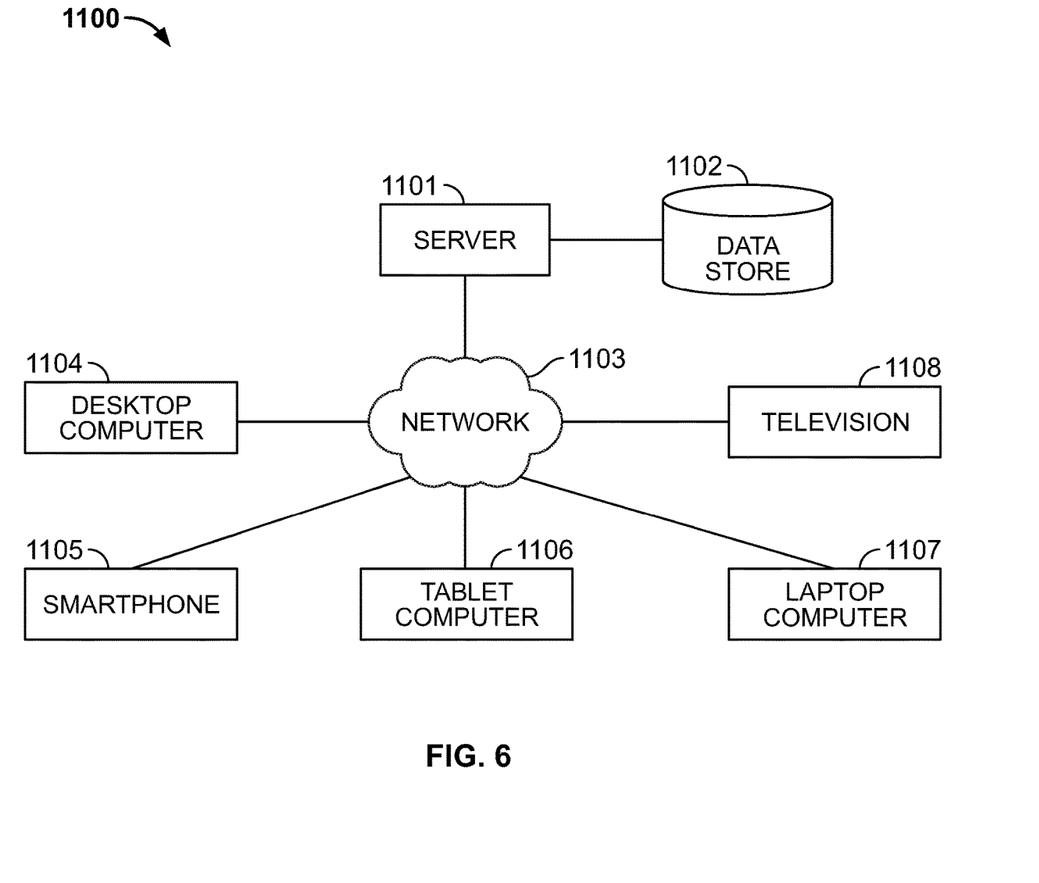
FIG. 6 is an illustration of a computing environment according to at least one embodiment.

In selected embodiments, features and aspects described herein may be implemented within a computing environment 1100, as shown in FIG. 6, which may include one or more computer servers 1101. The server 1101 may be operatively coupled to one or more data stores 1102 (e.g., databases, indexes, files, or other data structures). The server 1101 may connect to a data communication network 1103 including a local area network (LAN), a wide area network (WAN) (e.g., the Internet), a telephone network, a satellite or wireless communication network, or some combination of these or similar networks.

One or more client devices 1104, 1105, 1106, 1107, 1108 may be in communication with the server 1101, and a corresponding data store 1102 via the data communication network 1103. Such client devices 1104, 1105, 1106, 1107, 1108 may include, for example, one or more laptop computers 1107, desktop computers 1104, smartphones and mobile phones 1105, tablet computers 1106, televisions 1108, or combinations thereof. In operation, such client devices 1104, 1105, 1106, 1107, 1108 may send and receive data or instructions to or from the server 1101 in response to user input received from user input devices or other input. In response, the server 1101 may serve data from the data store 1102, alter data within the data store 1102, add data to the data store 1102, or the like, or combinations thereof.

In selected embodiments, the server 1101 may transmit one or more media files including image content, encoded data, generated data, and/or metadata from the data store 1102 to one or more of the client devices 1104, 1105, 1106, 1107, 1108 via the data communication network 1103. The devices may output image content from the media file using a display screen, projector, or other display output device. In certain embodiments, the system 1100 configured in accordance with the features and aspects described herein may be configured to operate within or support a cloud computing environment. For example, a portion of, or all of, the data store 1102 and server 1101 may reside in a cloud server.

Figure 7:
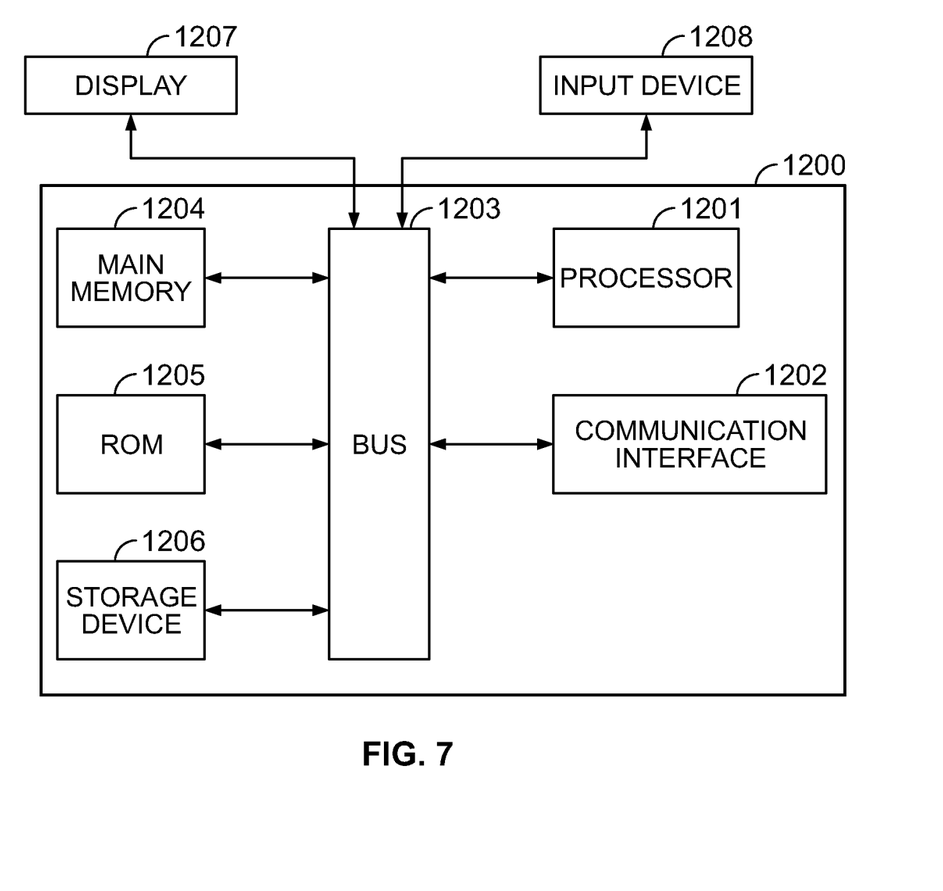
FIG. 7 is a block diagram of a device according to at least one embodiment.

With reference to FIG. 7, an illustration of an example computer 1200 is provided. One or more of the devices 1104, 1105, 1106, 1107, 1108 of the system 1100 may be configured as or include such a computer 1200. In addition, one or more components of the system 100 of FIG. 1 may be configured as or include the computer 1200.

In selected embodiments, the computer 1200 may include a bus 1203 (or multiple buses) or other communication mechanism, a processor 1201, main memory 1204, read only memory (ROM) 1205, one or more additional storage devices 1206, and/or a communication interface 1202, or the like or sub-combinations thereof. Embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

The bus 1203 or other communication mechanism, including multiple such buses or mechanisms, may support communication of information within the computer 1200. The processor 1201 may be connected to the bus 1203 and process information. In selected embodiments, the processor 1201 may be a specialized or dedicated microprocessor configured to perform particular tasks in accordance with the features and aspects described herein by executing machine-readable software code defining the particular tasks. Main memory 1204 (e.g., random access memory—or RAM—or other dynamic storage device) may be connected to the bus 1203 and store information and instructions to be executed by the processor 1201. Main memory 1204 may also store temporary variables or other intermediate information during execution of such instructions.

ROM 1205 or some other static storage device may be connected to a bus 1203 and store static information and instructions for the processor 1201. The additional storage device 1206 (e.g., a magnetic disk, optical disk, memory card, or the like) may be connected to the bus 1203. The main memory 1204, ROM 1205, and the additional storage device 1206 may include a non-transitory computer-readable medium holding information, instructions, or some combination thereof—for example, instructions that, when executed by the processor 1201, cause the computer 1200 to perform one or more operations of a method as described herein. The communication interface 1202 may also be connected to the bus 1203. A communication interface 1202 may provide or support two-way data communication between the computer 1200 and one or more external devices (e.g., other devices contained within the computing environment).

In selected embodiments, the computer 1200 may be connected (e.g., via the bus 1203) to a display 1207. The display 1207 may use any suitable mechanism to communicate information to a user of a computer 1200. For example, the display 1207 may include or utilize a liquid crystal display (LCD), light emitting diode (LED) display, projector, or other display device to present information to a user of the computer 1200 in a visual display. One or more input devices 1208 (e.g., an alphanumeric keyboard, mouse, microphone) may be connected to the bus 1203 to communicate information and commands to the computer 1200. In selected embodiments, one input device 1208 may provide or support control over the positioning of a cursor to allow for selection and execution of various objects, files, programs, and the like provided by the computer 1200 and displayed by the display 1207.

The computer 1200 may be used to transmit, receive, decode, display, etc. one or more video files. In selected embodiments, such transmitting, receiving, decoding, and displaying may be in response to the processor 1201 executing one or more sequences of one or more instructions contained in main memory 1204. Such instructions may be read into main memory 1204 from another non-transitory computer-readable medium (e.g., a storage device).

Execution of sequences of instructions contained in main memory 1204 may cause the processor 1201 to perform one or more of the procedures or steps described herein. In selected embodiments, one or more processors in a multi-processing arrangement may also be employed to execute sequences of instructions contained in main memory 1204. Alternatively, or in addition thereto, firmware may be used in place of, or in connection with, software instructions to implement procedures or steps in accordance with the features and aspects described herein. Thus, embodiments in accordance with the features and aspects described herein may not be limited to any specific combination of hardware circuitry and software.

Non-transitory computer readable medium may refer to any medium that participates in holding instructions for execution by the processor 1201, or that stores data for processing by a computer, and include all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, the communication interface 1202 may provide or support external, two-way data communication to or via a network link. For example, the communication interface 1202 may be a wireless network interface controller or a cellular radio providing a data communication network connection. Alternatively, the communication interface 1202 may include a local area network (LAN) card providing a data communication connection to a compatible LAN. In any such embodiment, the communication interface 1202 may send and receive electrical, electromagnetic, or optical signals conveying information.

A network link may provide data communication through one or more networks to other data devices (e.g., client devices as shown in the computing environment 1100). For example, a network link may provide a connection through a local network of a host computer or to data equipment operated by an Internet Service Provider (ISP). An ISP may, in turn, provide data communication services through the Internet. Accordingly, a computer 1200 may send and receive commands, data, or combinations thereof, including program code, through one or more networks, a network link, and communication interface 1202. Thus, the computer 1200 may interface or otherwise communicate with a remote server (e.g., server 1101), or some combination thereof.

The various devices, modules, terminals, and the like described herein may be implemented on a computer by execution of software comprising machine instructions read from computer-readable medium, as discussed above. In certain embodiments, several hardware aspects may be implemented using a single computer; in other embodiments, multiple computers, input/output systems and hardware may be used to implement the system.

For a software implementation, certain embodiments described herein may be implemented with separate software modules, such as procedures and functions, each of which performs one or more of the functions and operations described herein. The software codes can be implemented with a software application written in any suitable programming language and may be stored in memory and executed by a controller or processor.

The foregoing described embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method of autonomously generating one or more images, the method including:
   receiving, by a content server, an image having one or more characteristics rendering the image suitable for display at a device of a first breakpoint type;
   in response to receiving the image, autonomously deriving, by the content server, at least one image from the received image, the at least one derived image having one or more characteristics optimized for display at a device of a second breakpoint type different from the first breakpoint type; and
   controlling, by the content server, a display to display the received image and the at least one derived image, wherein:
   the received image is for display at a webpage; and
   the autonomous derivation of the at least one image occurs before receiving any user request for display of the received image along with the webpage.

2. The method of claim 1, wherein a display of the device of the first breakpoint type is larger in area than a display of the device of the second breakpoint type.

3. The method of claim 1, wherein:
   the device of the first breakpoint type comprises a desktop computer; and
   the device of the second breakpoint type comprises a mobile device.

4. The method of claim 3, wherein the mobile device comprises an electronic tablet or a mobile telephone.

5. The method of claim 1, wherein the at least one derived image is derived from the received image without receiving additional user instructions.

6. The method of claim 1, wherein the one or more characteristics of the at least one derived image that are optimized comprises at least an image aspect ratio, an image resolution, an image format, a color density, or image metadata.

7. The method of claim 6, wherein autonomously deriving the at least one image comprises autonomously deriving the at least one image to have at least a target image aspect ratio, a target image resolution, a target image format, or a target color density.

8. The method of claim 1, wherein autonomously deriving the at least one image comprises autonomously performing a cropping of the received image to generate the at least one derived image.

9. The method of claim 8, further comprising:
   after the at least one derived image is displayed, receiving, by the content server, at least one user instruction to modify the cropping of the received image;
   modifying, by the content server, the at least one derived image based on the at least one user instruction; and
   controlling, by the content server, the display to display the received image and the modified at least one derived image.

10. The method of claim 1, wherein autonomously deriving the at least one image comprises:
    autonomously deriving a first image from the received image, the derived first image having one or more characteristics optimized for display at the device of the second breakpoint type; and
    autonomously deriving a second image from the received image, the derived second image having one or more characteristics optimized for display at a device of a third breakpoint type different from both the first breakpoint type and the second breakpoint type.

11. The method of claim 10, wherein:
    the device of the first breakpoint type comprises a desktop computer;
    the device of the second breakpoint type comprises an electronic tablet; and
    the device of the third breakpoint type comprises a mobile telephone.

12. The method of claim 1, further comprising:
    receiving, by the content server, a second image having one or more characteristics rendering the second image suitable for display at the device of the first breakpoint type;
    autonomously deriving, by the content server, at least one second image from the received second image, the at least one derived second image having one or more characteristics optimized for display at the device of the second breakpoint type; and
    controlling, by the content server, the display to display the received second image and the at least one derived second image in place of the received image and the at least one derived image.

13. The method of claim 1, wherein:
    the received image corresponds to a component of the webpage; and
    the autonomous derivation of the at least one image is performed upon identifying a lack of derived images in the component.

14. A terminal for autonomously generating one or more images, the terminal comprising:
    a transceiver configured to transmit and receive data; and
    one or more processors configured to:
       receive an image having one or more characteristics rendering the image suitable for display at a device of a first breakpoint type;
       in response to receiving the image, autonomously derive at least one image from the received image, the at least one derived image having one or more characteristics optimized for display at a device of a second breakpoint type different from the first breakpoint type; and
       control a display to display the received image and the at least one derived image, wherein:

the received image is for display at a webpage; and the one or more processors are further configured to autonomously derive the at least one image before receiving any user request for display of the received image along with the webpage.

15. The terminal of claim 14, wherein a display of the device of the first breakpoint type is larger in area than a display of the device of the second breakpoint type.

16. The terminal of claim 14, wherein:

the device of the first breakpoint type comprises a desktop computer; and the device of the second breakpoint type comprises a mobile device.

17. The terminal of claim 16, wherein the mobile device comprises an electronic tablet or a mobile telephone.

18. The terminal of claim 14, wherein the one or more processors are further configured to derive the at least one image from the received image without receiving additional user instructions.

19. The method of claim 1, wherein controlling the display to display the received image and the at least one derived image comprises controlling the display to display the received image and the at least one derived image concurrently.

20. The terminal of claim 14, wherein the one or more processors are further configured to control the display to display the received image and the at least one derived image by controlling the display to display the received image and the at least one derived image concurrently.

* * * * *